United States Patent [19]

Tanaka et al.

[11] 4,136,657
[45] Jan. 30, 1979

[54] ELECTRIC CONTROL SYSTEM FOR DIESEL ENGINE

[75] Inventors: Keigo Tanaka, Anjo; Yoshiyuki Morita, Kariya, both of Japan

[73] Assignee: Nippondenso Co., Ltd., Kariya, Japan

[21] Appl. No.: 843,507

[22] Filed: Oct. 18, 1977

[30] Foreign Application Priority Data

Oct. 21, 1976 [JP] Japan .................. 51/142085[U]

[51] Int. Cl.$^2$ .................................... F02M 39/00
[52] U.S. Cl. ...................... 123/140 R; 123/139 ST; 123/179 H; 123/179 BG
[58] Field of Search ...... 123/140 R, 139 ST, 179 BG, 123/179 B, 179 A, 179 L, 198 DB, 102, 139 AZ, 32 EA

[56] References Cited

U.S. PATENT DOCUMENTS

| 2,587,376 | 2/1952 | Pelly et al. ............... 123/140 R |
| 3,003,489 | 4/1959 | Scribbe et al. ............ 123/140 R |
| 3,371,656 | 4/1967 | Stauffer et al. ........... 123/179 H |
| 3,485,226 | 12/1969 | Arendt et al. ............ 123/179 H |
| 3,529,588 | 9/1970 | Boesch .................... 123/179 BG |
| 3,533,391 | 3/1969 | Lockmuller .............. 123/198 DB |
| 3,788,294 | 1/1974 | Logan .................... 123/179 BG |
| 3,965,877 | 6/1976 | Adey ....................... 123/102 |
| 3,983,767 | 10/1976 | LeFouvre ................. 123/102 |
| 3,983,848 | 10/1976 | Handtmann et al. ....... 123/140 R |
| 4,047,507 | 9/1977 | Nuguchi et al. ........... 123/102 |

FOREIGN PATENT DOCUMENTS

| 624581 | 7/1961 | Canada ..................... 123/179 BG |
| 1299589 | 12/1972 | Fed. Rep. of Germany ... 123/179 BG |

Primary Examiner—Charles J. Myhre
Assistant Examiner—Raymond A. Nelli
Attorney, Agent, or Firm—Cushman, Darby & Cushman

[57] ABSTRACT

A reversible electric motor is employed for driving a control lever of a governor for a diesel engine fuel injection pump, so that the control lever is electrically and automatically driven by the motor in association of turning of a key switch. In a control circuit for the motor, a closed circuit for an armature coil of the motor is formed when the motor is stopped for providing an electric brake for the motor to thereby quickly stop the same at given positions.

2 Claims, 4 Drawing Figures

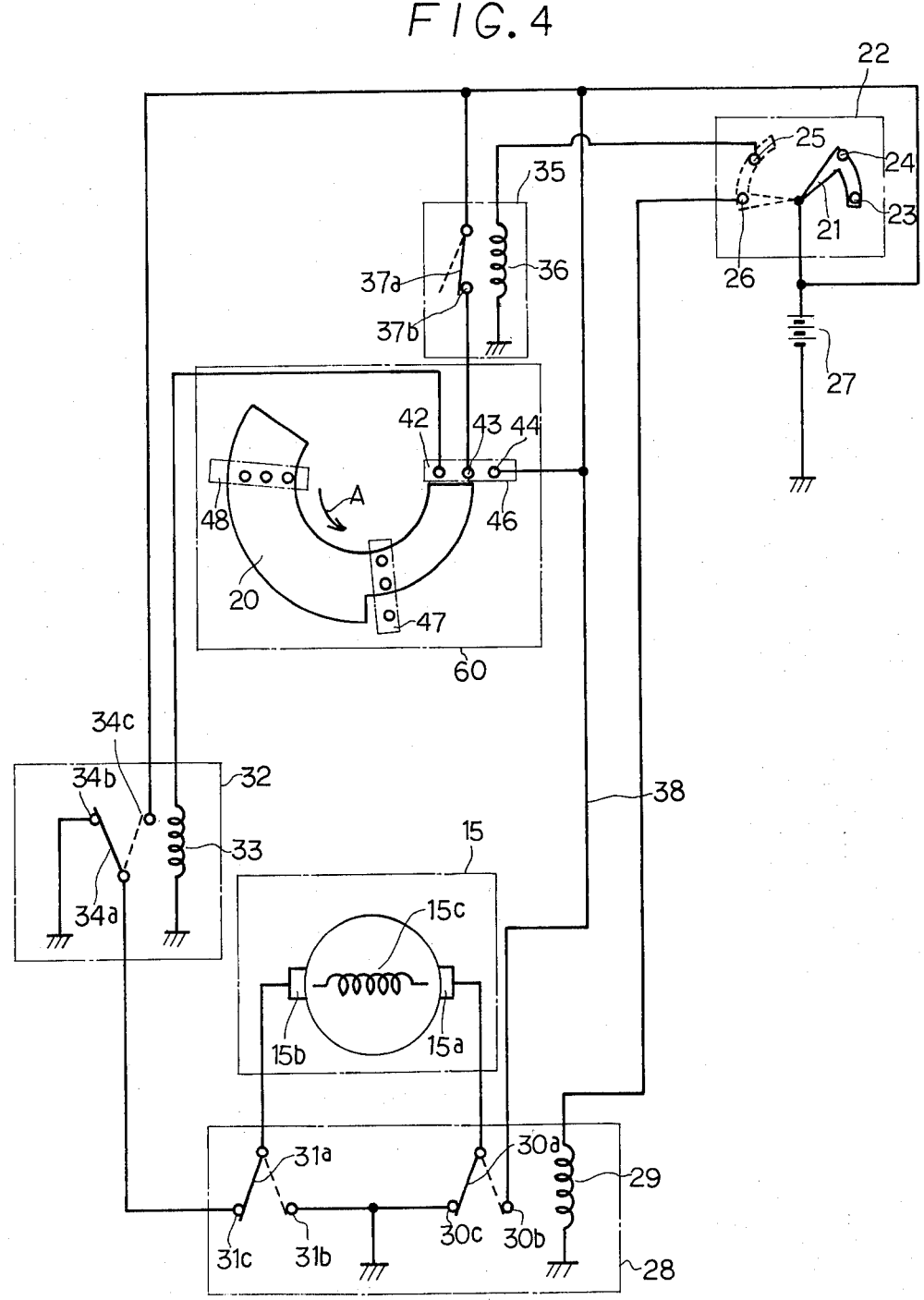

ELECTRIC CONTROL SYSTEM FOR DIESEL ENGINE

BACKGROUND OF THE INVENTION

The present invention relates to an electric control system for a governor for a diesel engine fuel injection pump, and more particularly to an electric control system which electrically and automatically cuts off fuel supply to the fuel injection pump when the engine is stopped and also which electrically actuates the governor for the fuel injection pump to increase the amount of fuel to be injected when the engine is started to ensure a smooth and stable starting thereof.

A pneumatic type governor for a diesel engine fuel injection pump is provided with a control lever which generally has three operating positions, that is a starting (fuel increasing) position where the fuel injection pump supplies the engine with fuel having a substantial increased amount for smoothly starting the engine, a normal operating position where the fuel injection pump supplies a proper amount of fuel to the engine in accordance with the operating conditions thereof, and a fuel cut-off position where the pump supplies no fuel to the engine for stopping the same.

Conventionally, a solenoid-operated device for the diesel engine electric control is proposed to electrically drive the control lever of the governor to the starting position during a time of starting the engine so that a control rack of the fuel injection pump is moved in a direction of increasing the amount of fuel. Thus, the substantial increased amount of fuel is supplied to the engine to smoothly start the engine.

However, in the above-mentioned solenoid-operated device, electric automatic actuation of the control lever is effective or operative for only starting the engine, and therefore it is still necessary for a driver to mannually drive the control lever of the governor to the fuel cut-off position when stopping the engine.

SUMMARY OF THE INVENTION

It is, therefore, an object of the present invention to provide an electric control system for a diesel engine which electrically and automatically actuates a control lever of a governor in association with the turning of a key, so that the control lever is moved to its starting (fuel increasing) position when the engine is started while the control lever is automatically moved to its fuel cut-off position when the engine is stopped.

According to one aspect of the present invention, a first relay having a first relay coil and movable contacts is provided, wherein the first relay coil is connected to a start position contact of a key switch and the movable contacts are respectively connected to brushes of a reversible electric motor, so that when said first relay coil is energized to start the engine the movable contacts connected the electric motor in a forward direction to a battery to thereby drive a control lever of a governor coupled to the motor to move to its starting position. A second relay has a second relay coil and a movable contact for connecting the electric motor in a reverse direction to drive the control lever to move from the starting position to the normal operation position and/or from the normal operation position to the fuel cut-off position when the second relay coil is energized and said first relay coil is deenergized.

The movable contact of the second relay and movable contacts of the first relay form a closed circuit for an armature coil of the electric motor to provide an electric brake for the motor when the first and second relay coils are both deenergized so that the rotation of the motor is quickly stopped.

A third relay has a third relay coil connected to a normal operation contact of the key switch and a movable contact for connecting a cam switch movable with the control lever to the battery when the third relay coil is deenergized, wherein the cam switch connects the second relay coil with the battery when the control lever is placed at position other than the fuel cut-off position.

Accordingly, when the movable contact of the key switch is separated from the starting position and normal operation contacts, the control lever of the governor is electrically actuated by the electric motor and is moved to and held in the fuel cut-off position to automatically stop the engine.

BRIEF DESCRIPTION OF THE DRAWINGS

FIG. 4 is an electric wiring diagram of the electric control system of the present invention.

DETAILED DESCRIPTION OF THE PREFERRED EMBODIMENT

Figure 1:
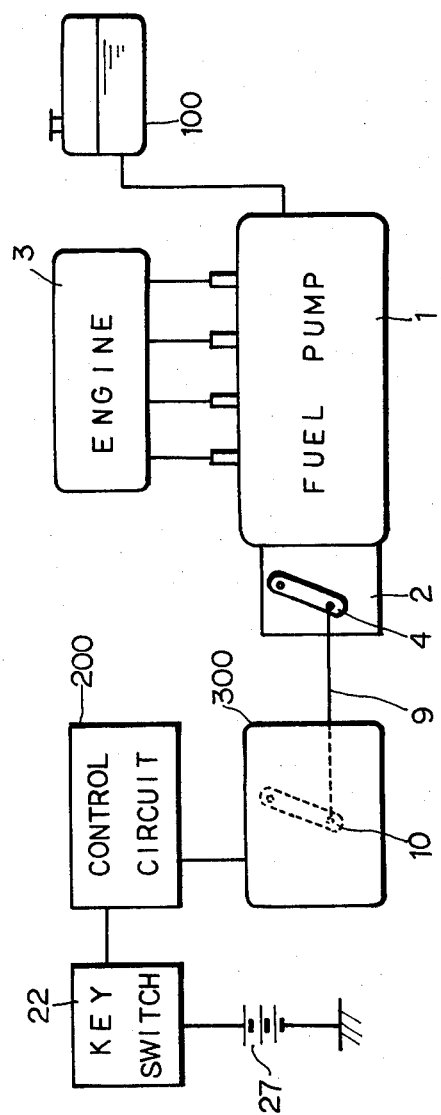
FIG. 1 is a schematic representation of an electric control system for a diesel engine according to the present invention.

In FIG. 1, a fuel pump 1 delivers fuel from a fuel tank 100 to respective cylinders of an engine 3 under pressure in a well-known manner. A governor 2 of a conventional pneumatic type, for example, is coupled to the fuel pump 1 for controlling the amount of the fuel to be supplied to the engine 3 in response to operational conditions of the engine such as an intake manifold vacuum or the like. The governor 2 is provided with a control lever 4 having three operating positions, that is a starting position, a normal operation position and a fuel cut-off position, which are described more in detail hereinafter. An actuator 300 is provided for actuating the control lever 4 to move the same to one of the operation positions so that when the control lever 4 is moved to the normal operation position the governor 2 controls the amount of fuel to be supplied to the engine in response to the engine operational conditions as in a known manner.

An electric control circuit 200 controls the actuating operation of the actuator 300 in response to positions (a movable contact) of an engine key switch 22 and the construction and operation of the circuit 200 will become apparent from the following description.

Figure 2:
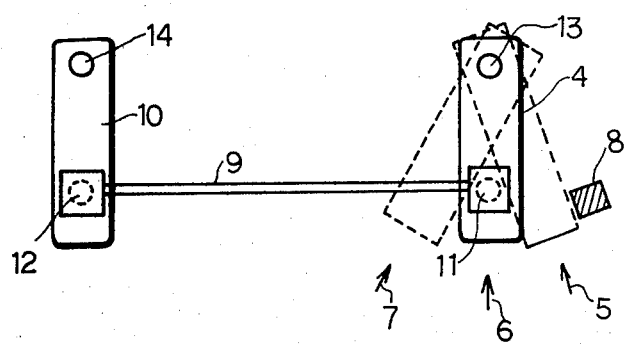
FIG. 2 is an enlarged schematic view showing a control lever and its operational positions.

In FIG. 2, the control lever 4 is fixed to a shaft 13 which is coupled to a control mechanism of a known type provided in the governor 2 so that the movement of the control lever 4 changes the operating modes of the fuel pump 1. The control lever 4 is rotatable about an axis of the shaft 13 and has three operating positions: the starting position 5 for increasing the amount of fuel which is required for starting the engine: the normal operation position 6 for controlling the amount of the fuel in response to the operational conditions of the engine: and the fuel cut-off position 7 for cutting off the fuel supply from the fuel tank 100 to the fuel pump 1 when the engine is stopped. Numeral 8 designates a stopper for the control lever 4. The control lever 4 is coupled to an actuating lever 10 of the actuator 300 through a link 9, both ends thereof being connected to the levers 4 and 10 by means of ball joints 11 and 12.

Figure 3:
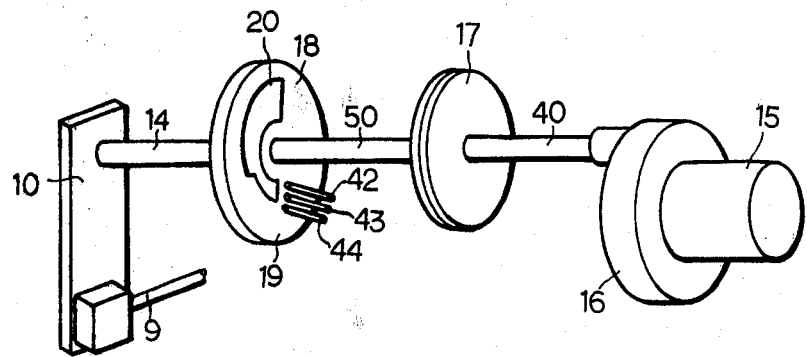
FIG. 3 is a schematic perspective view showing an actuator of the present invention.

In FIG. 3, wherein the construction of the actuator 300 is schematically shown, numeral 15 designates a reversible electric motor 15 operated by the control circuit 200. The rotational movement thereof is transmitted to a friction coupling 17 through a reduction gear device 16 and an input shaft 40. The output shaft 50 of the friction coupling 17 is connected to a disc 18 made of an insulating material as well as to a shaft 14 to which the actuating lever 10 is fixed so that the rotational movement of the motor 15 is transmitted to the actuating lever 10 through the reduction gear 16, the input shaft 40, the friction coupling 17, the output shaft 50, the disc 18 and the shaft 14. The disc 18 is not always necessary to be interposed between the friction coupling 17 and the actuating lever 10, because the disc 18 may be coupled to the actuating lever 10 from the opposite side so far as the disc 18 is rotated together with the actuating lever 10. On one surface 19 of the disc 18 is provided an arcuate conductive metal strip 20 and electrical terminals 42 to 44 are provided to slidingly abut on the surface 19 as well as the metal strip 20 so that when the disc 18 rotates the terminals 42 to 44 slide on the surface 19 to engage and disengage with the metal strip 20 in accordance with the rotation thereof. The metal strip 20 and terminals 42 to 44 form a cam (position) switch 60.

In FIG. 4, which shows an electric wiring diagram of the control circuit 200 and electrical connections with the actuator 300 and the key switch 22, the key switch 22 includes a movable contact 21 connected to the battery 27 and fixed contacts 23 to 26 to which the movable contact 21 engages respectively. The first fixed contact 23 is connected to a pre-heater (not shown) of the diesel engine such as a glow plug. The second contact 24 is an Off position contact of the key switch 22, whereby no electrical load is connected thereto. The third fixed contact 25 is an operating position contact and the fourth contact 26 is a start position contact which is connected to a starter (not shown).

The electric control circuit 200 includes first, second and third relays 28, 32 and 35, each having a (first to third) relay coil (29, 33 and 36), a (first to fourth) movable contact or contacts (30a, 31a, 34a and 37a) actuated by the electromotive force of the relay coil, and a (first to seventh) fixed contact or contacts (30b, 30c, 31b, 31c, 34b, 34c and 37b).

The first relay coil 29 of the first relay 28 is connected to the start position contact 26 of the key switch 22 so that the relay coil 29 is energized only when the movable contact 21 of the key switch 22 is thrown to the start position contact 26. The movable first and second contacts 30a and 31a are actuated by the relay coil 29, which are normally connected to the respective second and fourth fixed contacts 30a and 31c as indicated by solid lines while being connected to the other fixed (first and third) contacts 30b and 31b as indicated by dotted lines when the relay coil 29 is energized. The first fixed contact 30b is connected to the battery 27 via a wire 38. The second and third fixed contacts 30c and 31b are grounded. The movable contacts 30a and 31a are grounded. The movable contacts 30a and 31a of the first relay 28 are connected to the reversible motor 15, and more perticularly, respectively connected to brushes 15a and 15b of the motor 15.

The second relay coil 33 of the second relay 32 is connected to the first sliding terminal 42 of the cam (position) switch 60. The third movable contact 34a is connected to the fourth fixed contact 31c of the first relay 29 and is normally connected to the fifth fixed contact 34b when the second relay coil 33 is not energized as indicated by a solid line. The fixed contact 34b is grounded for the purpose described later. When the second relay coil 33 is energized, the movable contact 34a is connected to the sixth fixed contact 34c, as shown by a dotted line, which is connected to the battery 27.

The third relay coil 36 is connected to the operating position contact 25 of the key switch, so that the relay coil is energized so far as the movable contact 21 of the key switch 22 is placed to the operating position contact 25 to separate the fourth movable contact from the seventh fifth contact 37b, which is connected to the second sliding terminal 43 of the cam switch 60.

The cam switch 60 includes the arcuate metal strip 20 and sliding terminals 42 to 44 as described above, and the strip 20 rotates together with the disc 18 in response to the actuation of the actuating lever 10. A position of sliding terminals 42 to 44 designated by numeral 46 corresponds to the fuel cut-off position 7 of the control lever 4. In other words, the sliding terminals 42 to 44 are placed to and held in the position 46 when the engine is stopped. A position 47 of the terminals 42 to 44 relative to the metal strip 20 corresponds to the normal operation position 6 of the control lever 4 while a position 48 corresponds to the starting position 5 of the control lever 4. The sliding terminal 44 is connected to the battery 27.

An operation of the above described embodiment will be described hereinafter.

When the engine remains stopped with the movable contact 21 of the key switch 22 being placed to the Off position contact 24 as indicated by a solid line, none of relay coils of the first to third relays 28, 32 and 35 is energized so that the movable contacts 30a, 31a, 34a and 37a thereof remain as they are indicated by solid lines in FIG. 4. In this stage, the sliding terminals 42 to 44 are held in the position 46 with respect to the metal strip 20, while the control lever 4 is held in the fuel cut-off position 7.

When the movable contact 21 of the key switch 22 is thrown to the third and fourth contacts 25 and 26 to start the engine as indicated by a dotted line, the first and third relay coils 29 and 35 of the first and third relays 28 and 36 are electrically energized so that the movable contacts 30a and 31a of the first relay 28 are thrown to the fixed contacts 30b and 31b as shown by dotted lines and at the same time the movable contact 37a of the third relay 36 is separated from the contact 37b as likewise shown by a dotted line. With the energization of the first and third relay coils 29 and 36, current flows from the battery 27 through the line 38, the contacts 30b and 30a, the brush 15a of the motor 15, the armature coil 15c, the brush 15b, the contacts 31a and 31b and to the ground to drive the motor 15 in a forward direction. Thus the motor 15 is rotated and drive the control lever 4 in a direction to the starting position via the friction coupling 17, the disc 18, the actuating lever 10 and the shaft 9. With the drive of the control lever 4 to the starting position 5, the metal strip 20 on the disc 18 is also rotated in a direction A shown in FIG. 4 so that the sliding terminals 42 to 44 are moved from the position 46 to the position 48.

When the control lever 4 reaches the starting position 5, the lever 4 abuts on the stopper 8 and thereby the lever 4 is held in the starting position 5 even though the motor 15 is continued to rotate in the forward direction since the rotational movement of the motor 15 is absorbed in the friction coupling 17.

Since the control lever 4 is held in the starting position 5, the sliding terminals 42 to 44 are held in the position 48. In this condition, the sliding terminals 42 to 44 are electrically connected with each other through the conductive metal strip 20, and thus the relay coil 33 of second relay 33 is energized by the current flow from the battery 27 through the terminal 44, the metal strip 20, and the terminal 42 to the relay coil 33 to move the movable contact 34a to the fixed contact 34c as indicated by the dotted line. The closure of the contacts 34a and 34c, however, has no influence on the motor 15 at this stage, since the contacts 31a and 31c are separated as described above.

When the control lever 4 is placed to the starting position 5 as described above, the lever 4 drives a control rack (not shown) of the fuel injection pump 1 in such a manner that the amount of fuel to be supplied to the engine 3 is increased to such a substantial value as enables the smooth starting of the engine.

During the above operation with the movable contact 21 of the key switch 22 being thrown to the fourth contact 26, the starter motor (not shown) of the engine connected to the contact 26 is also actuated through the fourth contact 26 to start the engine.

As above, the control lever 4 of the governor is automatically actuated to the starting position 5 in association with the turning of the key switch 22, and the engine is smoothly started.

When the movable contact 21 of the key switch 22 is thrown to the third contact 25 after the engine has been started, the current supply to the first relay coil 29 is stopped to deenergize the same while remaining the second ant third relay coils 33 and 36 energized.

When the first relay coil 29 is deenergized the movable contacts 30a and 31a are placed back to the initial positions as indicated by the solid lines, so that the reverse current flow for the motor 15 begins from the battery 27 through the contacts 34c and 34a of the second relay 33, the contacts 31c and 31a, the brushes 15b and 15a, the contacts 30a and 30c and to the ground. With this current supply, the reversible motor 15 is rotated in a direction opposite to that of the previous rotation thereof during the energization of the first relay coil 29. This reversed rotation of the motor 15 is transmitted to the control lever 4 to drive the same in a direction to the normal operation position 6. At the same time, the metal strip 20 of the cam switch 60 is rotated in a direction opposite to the arrow A. When the control lever 4 is moved to the normal operation position 6, the sliding terminals 42 to 44 are moved to the position 47 where the terminal 44 is electrically disconnected from the terminals 42 and 43. With the disconnection between the terminals 42 and 44, the current flow to the relay coil 33 of the second relay 33 is stopped to deenergize the same so that the movable contact 34a is thrown back to the initial position of the fixed contact 34b which is grounded. The opening of the contacts 34a and 34b stops current supply to the motor 15. At the same time, a closed circuit for the armature coil 15c is formed through the contacts 30c and 30a, the brush 15a, the armature coil 15c, the brush 15b, the contacts 31a and 31c, the contacts 34a and 34b and the ground, so that the motor 15 is quickly stopped by the electric brake caused by the closed circuit. Accordingly, the control lever 4 is quickly stopped at the normal operation position 6.

When the movable contact 21 of the key switch 22 is thrown to the Off position contact 24 to stop the engine, the relay coil 35 of the third relay 36 is deenergized so that the movable contact 37a is moved back to the initial position of the fixed contact 37b. The closure of the contacts 37a and 37b again accomplishes the current supply to the relay coil 33 of the second relay 32 through the contacts 37a and 37b, the sliding terminal 43, the conductive metal strip 20, the sliding terminal 42, the relay coil 33 and to the ground, so that the movable contact 34a is again moved to the fixed contact 34c which is connected to the battery 27. Thus, the reverse current supply to the motor 15 is again accomplished to drive the control lever 4 to the fuel cut-off position 7. When the lever 4 is moved to and reaches the fuel cut-off position 7, the sliding terminals 42 to 44 are moved to and placed at the position 46 where the sliding terminal 42 is electrically disconnected from the sliding terminal 43, whereby the energization of the second relay coil 33 is ceased. When this occurs, the motor 15 is quickly stopped by the electric brake through the above mentioned closed circuit. Accordingly, the control lever 4 is quickly stopped at the fuel cut-off position 7, where the lever 4 drives the control rack of the fuel injection pump 1 to a fuel cut-off point whereby the fuel injection is automatically stopped in association with the turning of the key switch 22.

What is claimed is:

1. An electric control system for a diesel engine comprising:
   a fuel injection pump for supplying fuel to a diesel engine:
   a governor coupled to said fuel injection pump for controlling the amount of fuel to be supplied to said engine in response to operational conditions of said engine, said governor being provided with a control lever having a fuel cut-off position, a normal operation position and a starting position:
   a battery:
   a key switch having an Off position contact, an operating position contact, a start position contact and a movable contact connected to said battery:
   an actuator having a reversible electric motor operatively connected to said control lever of said governor for driving the same, and a cam switch operatively connected to said electric motor, said electric motor having a pair of brushes: and
   an electric control circuit for controlling the operation of said electric motor in accordance with the turning of said key switch,
   said electric control circuit including;
   a first relay having a first relay coil connected to said start position contact of said key switch, first and second movable contacts respectively connected to said brushes of said electric motor, and first to fourth fixed contacts, said first fixed contact being connected to said battery, said second and third fixed contacts being connected to the ground, said first and second movable contacts being respectively connected to said first and third fixed contacts when said first relay coil is energized while said first and second movable contacts being respectively connected to said second and fourth fixed contacts when said first relay coil is deenergized;

a second relay having a second relay coil, a third movable contact connected to said fourth fixed contact of said first relay, a fifth fixed contact connected to said battery, and a sixth fixed contact connected to the ground, said third movable contact being connected to said fifth fixed contact when said second relay coil is energized while being connected to said sixth fixed contact when said second relay coil is deenergized; and a third relay having a third relay coil connected to said operating position contact of said key switch, a fourth movable contact connected to said battery, and a seventh fixed contact, said movable contact being connected to said seventh fixed contact when said third coil is deenergized;

said cam switch having a movable conductive metal plate rotatable with said control lever, and first, second and third sliding contacts, said first sliding contact being connected to said battery and being contacted with said metal plate when said control lever is moved from said starting position to said normal operation position, said second sliding contact being connected to said seventh fixed contact of said third relay and being contacted with said metal plate when said control lever is positioned at a place other than said fuel cut-off position, said third sliding contact being connected to said second relay coil of said second relay and being contacted with said metal plate when said control lever is positioned at a position other than said fuel cut-off position.

2. An electric control system for a diesel engine comprising:

a battery:

a key switch having an Off position contact, an operating position contacts, a start position contact, and a movable contact connected to said battery:

a fuel injection pump for supplying fuel to a diesel engine:

a governor coupled to said fuel injection pump for controlling the amount of fuel to be supplied to said engine in response to operational conditions of said engine, said governor being provided with a control lever having a fuel cut-off position, a normal operation position and a starting position:

an actuator having a reversible electric motor operatively connected to said control lever of said governor for driving the same, and a position switch operatively connected to said control lever, said electric motor having a pair of brushes and an armature coil electrically connected across said pair of brushes: and an electric control circuit for controlling the operation of said electric motor in accordance with the turning of said movable contact of said key switch, said electric control circuit including;

a first relay having a first relay coil connected to said start position contact of said key switch and a pair of movable contacts respectively connected to said pair of brushes, said first relay driving said movable contacts to connect said pair of brushes across said battery in a forward direction when said first relay coil is energized;

a second relay having a second relay coil connected to said position switch and a movable contact, said position switch connecting said second relay coil to said battery when said control lever is positioned to said starting position and disconnecting from said battery when said control lever is positioned to said normal operation position, said second relay coil driving said movable contact of said second relay to connect said pair of brushes across said battery in a reverse direction when said second relay coil is energized and said first relay coil is deenergized, said movable contact of said second relay connecting said pair of brushes with each other for establishing a closed circuit to provide an electric brake for said electric motor when said first and second relay coils are both deenergized; and a third relay having a third relay coil connected to said operating position contact of said key switch and a movable contact for connecting said position switch with said battery when said third relay coil is deenergized, said position switch connecting said second relay coil with said battery through said movable contact of said third relay when said control lever is placed at a position other than said fuel cut-off position.

* * * * *